US008479679B1

(12) United States Patent
Wiese

(10) Patent No.: US 8,479,679 B1

(45) Date of Patent: Jul. 9, 2013

(54) FLAG POLE TOP SUPPORT BRACKET ASSEMBLY

(76) Inventor: Michael J Wiese, Elko, MN (US)

( * ) Notice: Subject to any disclaimer, the term of this patent is extended or adjusted under 35 U.S.C. 154(b) by 744 days.

(21) Appl. No.: 12/542,344

(22) Filed: Aug. 17, 2009

Related U.S. Application Data

(63) Continuation of application No. 11/583,451, filed on Oct. 19, 2006, now Pat. No. 7,575,209.

(51) Int. Cl.
*G06F 17/00* (2006.01)

(52) U.S. Cl.
USPC .................... 116/173; 248/219.4; 248/219.3; 248/219.2; 248/224.7

(58) Field of Classification Search
USPC ................ 248/218.4, 219.3, 539, 219.2, 214, 248/224.7; 116/173; D8/354, 355
See application file for complete search history.

(56) References Cited

U.S. PATENT DOCUMENTS 811,209 A 1/1906 Farrell
859,233 A 7/1907 Lane
918,579 A 4/1909 Murch
993,121 A 5/1911 Stone
1,057,268 A 3/1913 Phillips
1,288,060 A 12/1918 Leduc
1,745,814 A 2/1930 Sadler
2,290,645 A 7/1942 Lange
2,324,353 A * 7/1943 Berry ................................ 43/24
2,483,396 A 10/1949 Benson
2,601,088 A 6/1952 Burgess
2,753,439 A 7/1956 Greenfield
2,906,234 A 9/1959 Scott
2,947,557 A 8/1960 Schwab
2,989,329 A 6/1961 Noah
3,035,802 A * 5/1962 Burns et al. ................ 248/219.2
3,153,252 A * 10/1964 Ricciardi ..................... 15/144.4
3,157,378 A 11/1964 Blum
3,183,886 A 5/1965 Moffitt
3,421,248 A * 1/1969 Kennedy ........................... 43/24
3,423,781 A 1/1969 Hanson
3,474,833 A 10/1969 Garrette
RE26,779 E * 2/1970 Weichenrieder ............ 116/63 R
3,498,576 A * 3/1970 Alissandratos ............... 211/107

(Continued)

OTHER PUBLICATIONS

Advertisement, “Poly Rings for 15'Flagpole”, website: www.uncommonusa.com; pp. 1-2, copyright 2005.

(Continued)

*Primary Examiner* — Terrell McKinnon
*Assistant Examiner* — Michael McDuffie
(74) *Attorney, Agent, or Firm* — Jeffrey A. Proehl; Woods, Fuller, Shultz & Smith, P.C.

(57) ABSTRACT

A flagpole top support bracket assembly for a top end of a flagpole is disclosed, and includes a cap for mounting on the upper end of the flagpole. The cap defines a cavity for receiving an upper portion of the flagpole, and the cavity extends inwardly from an opening in a lower end of the cap. The cap has an outer surface and an annular groove formed in the outer surface. The bracket assembly further includes a support mounted on the cap, and the support is rotatable with respect to the cap. The support includes a mounting lip for resisting sliding of the support off of the cap, and the mounting lip extends inwardly toward the cap and is configured to be at least partially positioned in the annular groove of the cap.

17 Claims, 5 Drawing Sheets

U.S. PATENT DOCUMENTS

| | | | | | |
|---|---|---|---|---|---|
| 3,556,331 | A | | 1/1971 | Towns | |
| 3,559,834 | A | | 2/1971 | Taylor | |
| 3,567,057 | A | | 3/1971 | Landen | |
| 3,591,205 | A | | 7/1971 | Hamburg | |
| 3,596,946 | A | | 8/1971 | Burton | |
| 3,611,360 | A | | 10/1971 | Bailey | |
| 3,640,498 | A | | 2/1972 | Aleks | |
| 3,664,617 | A | * | 5/1972 | Fenwick | 248/539 |
| 3,675,615 | A | | 7/1972 | Stangarone | |
| 3,738,075 | A | | 6/1973 | Nansel | |
| 3,830,413 | A | * | 8/1974 | Birrell | 222/563 |
| 3,955,786 | A | | 5/1976 | Duddy | |
| 4,079,555 | A | | 3/1978 | Barnes | |
| 4,299,421 | A | | 11/1981 | Bontrager | |
| 4,306,708 | A | * | 12/1981 | Gassaway et al. | 267/141.3 |
| 4,406,097 | A | | 9/1983 | Meston | |
| 4,464,078 | A | | 8/1984 | Vorobyov | |
| 4,518,162 | A | | 5/1985 | Oates | |
| 4,522,378 | A | * | 6/1985 | Nelson | 267/141.4 |
| 4,619,219 | A | | 10/1986 | Millard | |
| 4,632,354 | A | | 12/1986 | Asciutto | |
| 4,800,834 | A | | 1/1989 | Feng | |
| 4,918,896 | A | | 4/1990 | Wiese | |
| 5,343,825 | A | | 9/1994 | Gazecimeon | |
| 5,485,700 | A | | 1/1996 | Van Vranken | |
| 5,540,017 | A | * | 7/1996 | Eilam et al. | 52/118 |
| 5,572,835 | A | | 11/1996 | Atkins | |
| 5,641,141 | A | | 6/1997 | Goodwin | |
| 5,732,927 | A | * | 3/1998 | Purpura | 248/539 |
| 5,738,317 | A | * | 4/1998 | Hugron | 248/176.1 |
| 5,741,084 | A | | 4/1998 | Del Rio | |
| 5,848,839 | A | | 12/1998 | Savage | |
| 5,904,116 | A | | 5/1999 | Wyner | |
| 5,964,444 | A | | 10/1999 | Guertler | |
| 5,983,825 | A | | 11/1999 | Nowak | |
| 6,134,819 | A | * | 10/2000 | McClain et al. | 40/586 |
| 6,244,557 | B1 | | 6/2001 | Maze | |
| 6,250,596 | B1 | * | 6/2001 | Gordin et al. | 248/230.1 |
| 6,287,042 | B1 | | 9/2001 | Eriksson | |
| 6,343,568 | B1 | | 2/2002 | McClasky | |
| 6,443,172 | B2 | | 9/2002 | Brumfield | |
| 6,494,636 | B1 | | 12/2002 | Mozena | |
| 6,530,338 | B2 | | 3/2003 | Okumura | |
| 6,595,226 | B2 | | 7/2003 | Uemura | |
| 6,695,266 | B1 | | 2/2004 | Tsai | |
| 6,848,388 | B2 | * | 2/2005 | Shields | 116/173 |
| 7,017,891 | B2 | * | 3/2006 | Izabel | 267/141.4 |
| 2001/0022153 | A1 | * | 9/2001 | Okumura et al. | 116/173 |
| 2002/0014182 | A1 | | 2/2002 | Yadav | |
| 2002/0037192 | A1 | | 3/2002 | Eriksson | |
| 2002/0178998 | A1 | | 12/2002 | Okumura | |
| 2005/0098084 | A1 | * | 5/2005 | Puett | 116/173 |
| 2007/0068445 | A1 | | 3/2007 | Priegel | |

OTHER PUBLICATIONS

Advertisement, "External Halyard Trucks Revolving With Spindle", website: www.americanflagstore.com; pp. 1-3.

Advertisement, "External Halyard Flagpole Trucks Stationary/ Fixed", website: www.americanflagstore.com; pp. 1-2.

Advertisement, "TopFlight Flagpole Set", website: www. topflightflagpole.com; pp. 1-3, copyright 2003.

US-Flag.com, "Telescoping Flagpole Installation Instructions", revised Nov. 17, 2003.

* cited by examiner

FLAG POLE TOP SUPPORT BRACKET ASSEMBLY

REFERENCE TO RELATED APPLICATION

This application is a continuation of U.S. patent application Ser. No. 11/583,451, filed Oct. 19, 2006, now U.S. Pat. No. 7,575,209, which is hereby incorporated herein in its entirety.

BACKGROUND OF THE INVENTION

1. Field of the Invention

The present invention relates to flagpole hardware and more particularly pertains to a new flagpole top support bracket assembly for mounting on the top of a flagpole to support a flag.

2. Description of the Prior Art

Flagpoles, and the various types of hardware used in association with the flagpoles, are generally well known. The most common and recognized flagpole are those that have a fixed length and employ some type of rope or cable to support and move the flag up and down the pole as needed. Less common are telescopic flagpoles, such as is described in my U.S. Pat. No. 6,951,185, issued Oct. 4, 2005 and incorporated here by reference in its entirety, which are extendable and retractable. Due to their telescopic nature, these flagpoles present challenges that are not always adequately addressed by the hardware employed on the conventional fixed length flagpoles. For example, because the sections telescope in and out of each other, the hardware cannot be immovably mounted on the sections, and must be able to be removed or at least slide along the length of the sections. This stresses the hardware, and periodically the hardware needs to be removed and replaced.

One piece of hardware that is subject to this periodic repair or replacement is the flag support bracket assembly that is located at the top of the pole. This bracket typically rotates about the pole to permit substantially free movement of the flag about the pole, but resists or prevents downward movement of the top of the flag on the flagpole. The known design of this top bracket requires that the ball or other ornament mounted at the top of the pole be removed from the flagpole to remove and replace the bracket. It is believed that this requirement unnecessarily complicates the replacement of the bracket, and increases the risk that the bracket will be incorrectly removed or replaced, or that the ornament will become damaged in the time period that it is removed from the pole. Furthermore, in at least some of the known designs, improper tightening of the ornament or other retaining structure will restrict or prevent rotation of the bracket, or may allow too much movement of the bracket relative to the pole, which can lead to excessive wear and premature failure. Other designs employ inserts that insert into the top end of the pole to hold the bracket in place, but again improper positioning of the insert can resist rotation. Further, the known insert design requires the bracket to contact and ride on the upper edge of the hollow flag pole, and thus could also lead to excessive wear and premature failure if the top edge is not sufficiently smooth or the materials used for the flagpole and the bracket are not of similar wear resistance.

It is therefore believed that there is a need for an improved top bracket for supporting the flag on a flagpole that doesn't require removal of the top ornament from the flagpole to replace the bracket, and that provides additional improvements in the operation and reliability in the top bracket.

SUMMARY OF THE INVENTION

In view of the foregoing disadvantages inherent in the known types of flagpole hardware now present in the prior art, the present invention provides a new flagpole top support bracket assembly construction wherein the same can be more easily mounting on and dismounted from the top of a flagpole to support a flag.

To attain this, the present invention generally comprises a flag support bracket assembly for a top end of a flagpole, and includes a cap for mounting on the upper end of the flagpole. The cap defines a cavity for receiving an upper portion of the flagpole, and the cavity extends inwardly from an opening in a lower end of the cap. The cap has an outer surface and an annular groove formed in the outer surface. The bracket assembly further includes a support mounted on the cap, and the support is rotatable with respect to the cap. The support includes a mounting lip for resisting sliding of the support off of the cap, and the mounting lip extends inwardly toward the cap and is configured to be at least partially positioned in the annular groove of the cap.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to remove the support of the assembly from the cap (and replace the support on the cap) without having to remove the cap (or any ornament mounted on the cap) from the flagpole. Another advantage is the protection of the flagpole from wear due to the rotation of the support.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
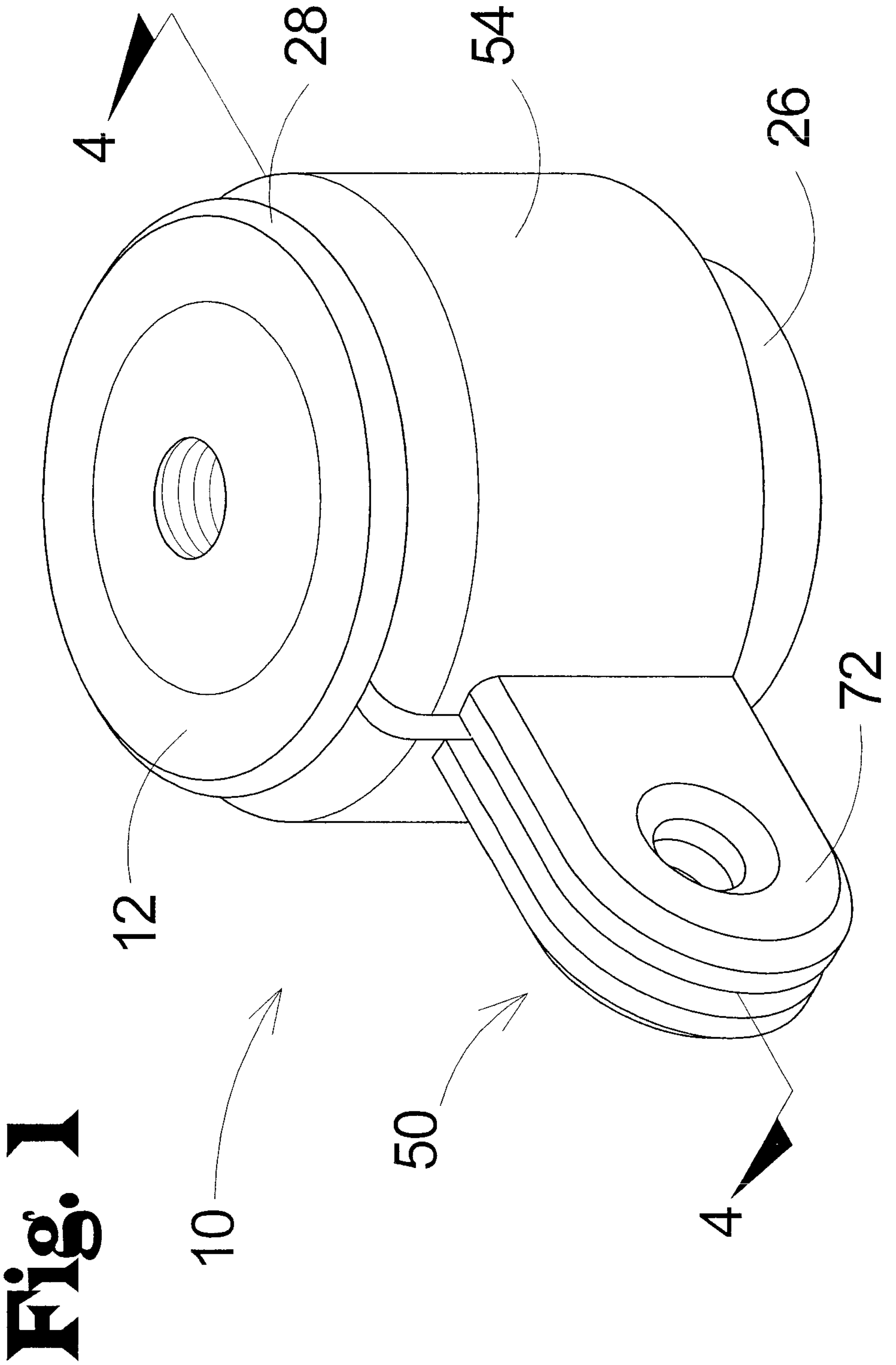
FIG. 1 is a schematic perspective view of a new flagpole top support bracket assembly according to the present invention.
Figure 2:
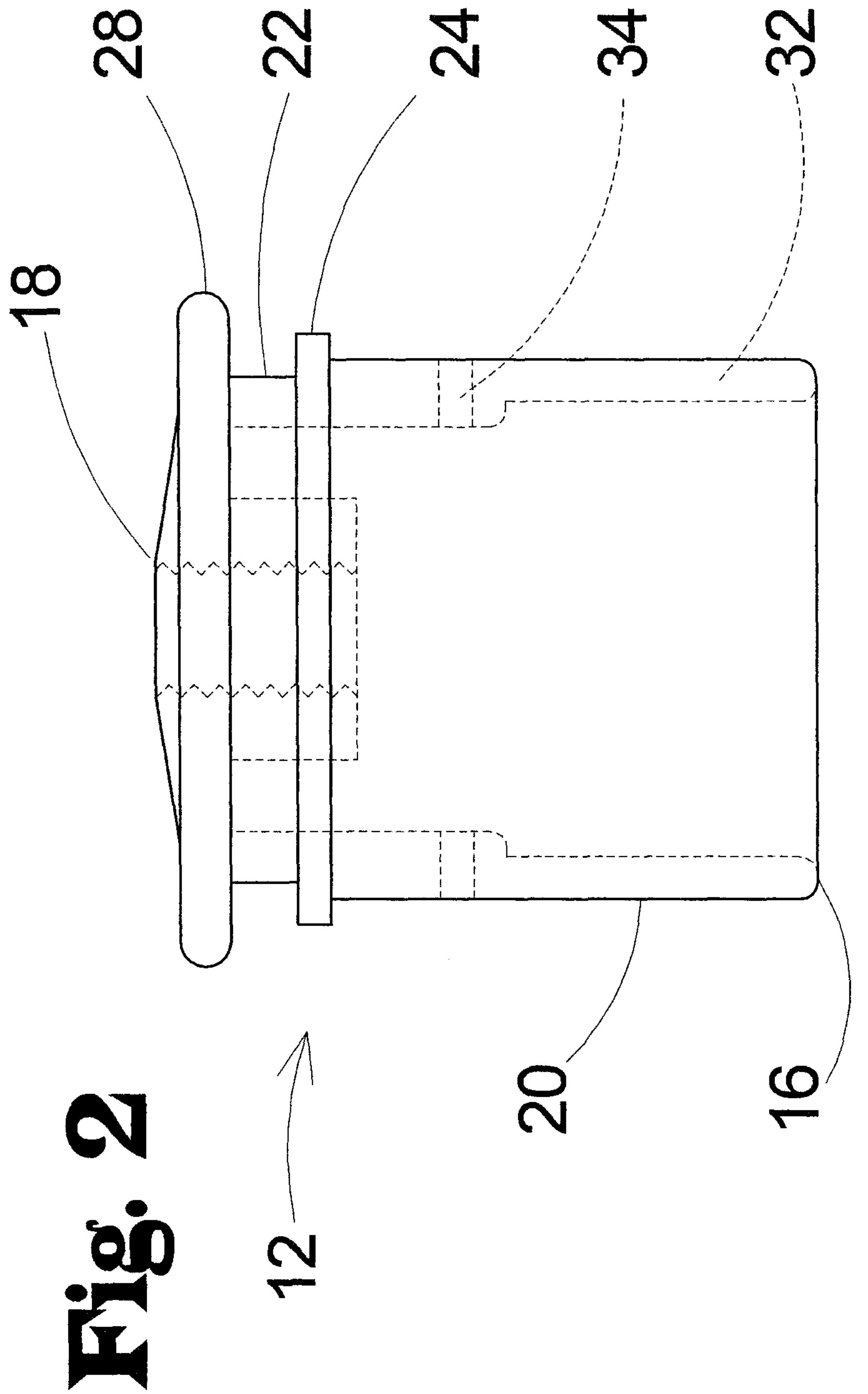
FIG. 2 is a schematic side view of the cap of the present invention.
Figure 3:
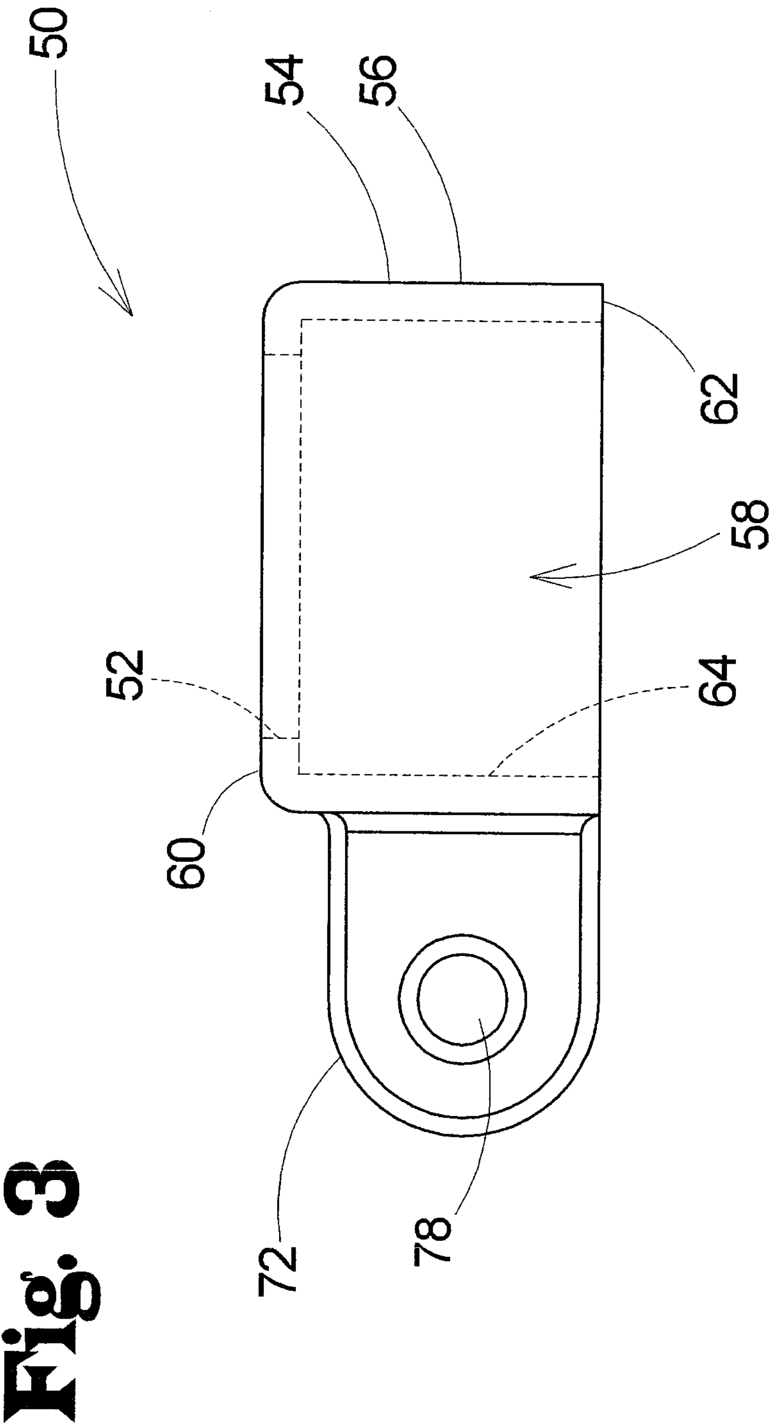
FIG. 3 is a schematic side view of the support of the present invention.
Figure 4:
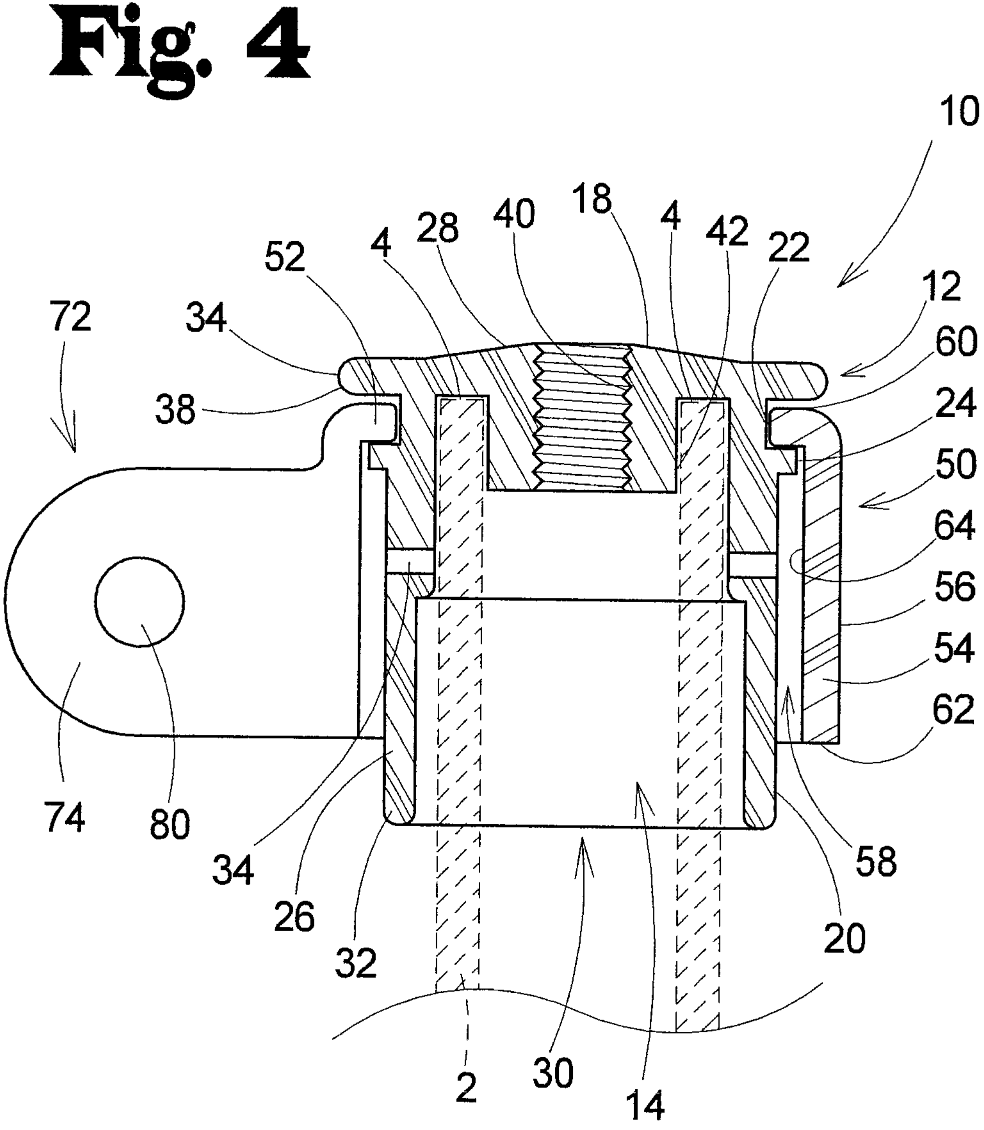
FIG. 4 is a schematic sectional view of the present invention.
Figure 5:
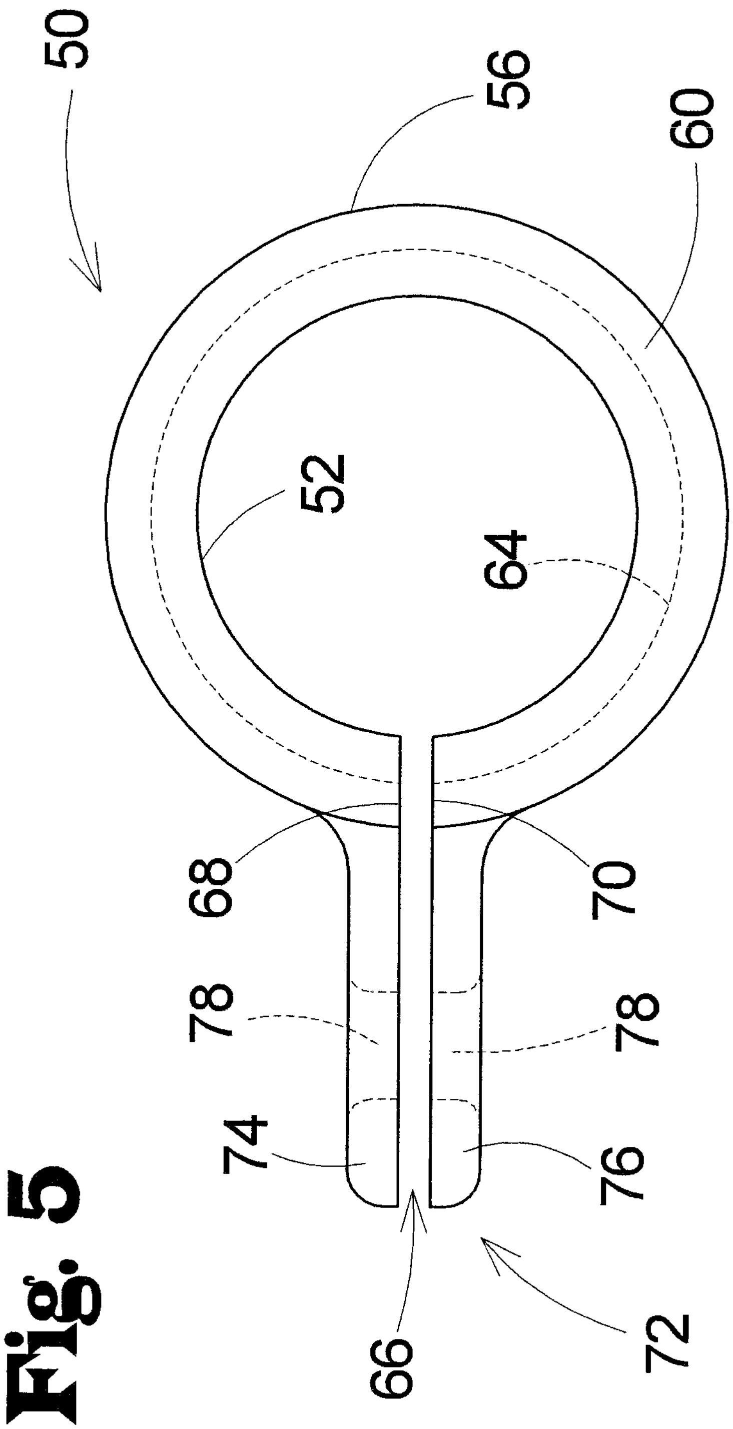
FIG. 5 is a schematic bottom view of the present invention.

With reference now to the drawings, and in particular to FIGS. 1 through 5 thereof, a new flagpole top support bracket assembly embodying the principles and concepts of the present invention and generally designated by the reference numeral 10 will be described.

As best illustrated in FIGS. 1 through 6, the flagpole top support bracket assembly 10 generally comprises a cap 12 and a support 50 mounted on the cap.

The flag support bracket assembly 10 of the invention is for use on a flagpole 2, and is suitably positionable on the top end 4 of the flagpole 2. The support bracket assembly 10 may comprise a cap 12 for mounting on the top end 4 of the flagpole 2. The cap 12 may define a cavity 14 for receiving an upper portion of the flagpole 2. The cavity 14 may extend inwardly from a lower end 16 of the cap 12. The cap 12 also has an upper end 18 that is located opposite of the lower end 16, and the cap 12 has an outer surface 20.

In one significant aspect of the invention, the cap 12 may include an annular groove 22 formed in the outer surface 20. The annular groove 22 is located between the upper 18 and lower 16 ends of the cap 12. The annular groove 22 may be located toward the upper end 18 of the cap 12. Another unique feature that may be included in the support bracket assembly 10 of the invention is an annular lip 24 that extends outwardly from the outer surface 20 of the cap 12. In some embodiments, the annular lip 24 may be positioned below the annular groove 22 for reasons that will become apparent later in this description.

In greater detail, the cap 12 may include a receiver portion 26 and a stop portion 28. The receiver portion 26 receives the upper portion of the flagpole 2 including the top end 4, and may be permanently or removably mounted on the flagpole. The receiver portion 26 may be located at the lower end 16 of the cap 12. The receiver portion 16 defines the cavity 14 and an opening 30 at the lower end 16 of the cap. The receiver portion 26 may comprise a perimeter wall 32 that extends about the cavity 14. The perimeter wall 32 may have an outer surface, which may be substantially cylindrical in shape. The receiver portion may include at least one fastener receiving hole 34 (and may include two such holes 34 in substantial opposition to each other) that extends through the perimeter wall 32. The annular groove 22 may be formed on the receiver portion 26. In some embodiments, the diameter of the annular groove 22 is smaller than the diameter of the outer surface of the perimeter wall 32. The annular lip 24 may be formed on the perimeter wall 32. The outer diameter of the annular lip 24 is greater than the diameter of the outer surface of the perimeter wall such that the annular lip extends outwardly from the outer surface.

As can be appreciated from the above description, the top end 4 of the flagpole 2 may be inserted into the cavity 14 of the cap 12 so that at least a portion of the exterior of the flagpole is covered by the cap.

The stop portion 28 of the cap 12 may be located at the upper end 18 of the cap, and may close an upper end of the cavity 14 of the cap. The stop portion 28 may have an outer perimeter 36, and the outer perimeter may comprise an edge 38. A bore 40 may extend through the stop portion 28, and an interior surface of the bore may be threaded, to permit the mounting of an ornament on the cap 12 using a threaded shaft extending from the ornament. The stop portion 28 may resemble a disk. The stop portion 28 may include an extension 42 that extends from a bottom surface of the stop portion 28. The bore 40 may extend through the extension 42 to provide additional length for the bore and thus provide additional threaded surface. The annular groove 22 may be positioned adjacent to a juncture of the receiver portion 26 and the stop portion 28.

The diameter of the outer perimeter 36 of the stop portion 28 may be greater than the diameter of the outer surface of the perimeter wall 32 of the receiver portion 26, which may help to resist water and debris from moving between the cap 12 and the support 50. Optionally, the stop portion 28 could be omitted from the cap 12 if the benefits set forth above were not desired.

The support 50 of the support bracket assembly 10 is mountable on the cap 12, and the support 50 is most preferably rotatable with respect to the cap 12. The support 50 may be removably mounted on the cap 12 to permit removal (and possible replacement) of the support from the flagpole 2 without requiring removal of the cap itself from the flagpole. The support 50 may include a mounting lip 52 for resisting sliding of the support off of the cap 12. The mounting lip 52 may extend inwardly toward the cap 12 when the support 50 is mounted on the cap. The mounting lip 52 may be configured to be at least partially positioned in the annular groove 22 of the cap 12 when the support 50 is mounted on the cap. The mounting lip 52 may at least partially rest on the annular lip 24 when the support 50 is mounted on the cap 12 to help increase the bearing surface between the support 50 and the cap 12 when the support is mounted on the cap.

The support 50 may comprise a sleeve portion 54 that is removably mounted on the cap 12. The sleeve portion 54 may extend about the receiver portion 26 of the cap, and may include a peripheral wall 56 that defines an interior 58 for receiving the cap 12. The mounting lip 52 may be mounted on the sleeve portion 54 and may extend inwardly into the interior 58. The sleeve portion 54 may have first 60 and second 62 ends, and the peripheral wall 56 may have an inner surface 64. The peripheral wall 56 may be substantially cylindrical. The mounting lip 52 may extend inwardly from the inner surface 64 of the peripheral wall 56. In some embodiments of the invention, the length of the perimeter wall 32 of the cap 12 and the length of the peripheral wall 56 of the sleeve portion 54 are such that the perimeter wall 32 is positioned between the flagpole and all portions of the flagpole, and so that the sleeve portion 54 does not contact the flagpole 2 as the sleeve portion rotates on the cap 12. This isolation of the sleeve portion 54 from the flagpole by the cap 12 can reduce or eliminate wear on the support 50 and the flagpole 2 as the support rotates. The wear, if any, thus occurs on the support 50 or the cap 12 as these are the parts that are rotating on each other.

A slit 66 may extend between the first 60 and second 62 ends of the sleeve portion 54. The slit 66 may be formed by a gap between opposing ends 68, 70 of the peripheral wall on opposite sides of the slit 66. The sleeve portion 54 may be formed of a rigid material with a small degree of resilient flexibility to permit the opposite ends 68, 70 of the sleeve portion to be spread apart from each other. One suitable material having the indicated characteristics is a polycarbonate resin that is hard and practically unbreakable, such as, for example, that sold under the trademark LEXAN from GE-Plastics, One Plastics Ave., Pittsfield, Mass. 01201. When the sleeve portion 54 is formed if a suitably resiliently flexible mater, the ends 68, 70 may be spread to a sufficient degree that the receiver portion 26 of the cap 12 is able to pass between the ends 68, 70 and thus the support 50 is dismounted from the cap 12. Conversely, the ends 68, 70 may be spread apart and the cap 12 passed between the ends to permit the support 50 to be mounted on the cap 12. In this way, the cap 12 does not need to be removed from the top end 4 of the flagpole 2 in order to remove the support 50 from the flagpole.

The support 50 may also include an ear portion 72 for providing a mounting location for clips or cords attached to the flag. The ear portion 72 may extend outwardly from the sleeve portion 54, and may include an aperture 78 for receiving a clip or cord or other attachment structure. The ear portion 72 may include a pair of ears 74, 76, and each of the ears may be positioned adjacent to one of the ends 68, 70 of the peripheral wall 56 of the sleeve portion 54. The pair of ears 68, 70 may be positioned adjacent to each other on opposite aides of the gap formed by the slit 66. The aperture in a first one 74 of the ears may be axially aligned with the aperture in a second one 76 of the ears. The ears 74, 76, may function as finger holds for the fingers of the user when the user seeks to spread the ends 68, 70 of the peripheral wall 56 apart to mount or dismount the support 50 from the cap 12.

In use, the cap 12 is mounted on the top end 4 of the flag pole 2 by inserting the top end into the cavity 14 of the cap. An ornament may then be mounted on the cap 12 using, for example, the threads on the bore 40 to accept a threaded fastener. If not already mounted on the cap 12, the support may be mounted on the cap 12 by spreading the ends 68, 70 of the sleeve portion 54 a sufficient distance so that the receiver portion is able to move between the ends 68, 70 of the sleeve portion 54. Once the receiver portion 26 is positioned in the interior 58 of the sleeve portion, the pressure on the ends 68, 70 may be relaxed and the ends should move back to a substantially adjacent relationship. A clip or other attachment means may be attached to the apertures 78 of the ears 74, 76 to hold the ears together. When wear requires replacement of the support 50, the mounting process may be reversed to remove the support and another support may be installed, without having to remove the cap 12 from the flagpole 2 (assuming that the cap 12 is not excessively worn) or without having to remove the ornament from the flagpole.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flag support bracket assembly for a top end of a flagpole, comprising:

a cap for mounting on the upper end of the flagpole, the cap defining a cavity extending inwardly from an opening in a lower end of the cap, the cap having an outer surface, the cap having an annular groove formed in the outer surface; and a support mounted on the cap, the support being rotatable with respect to the cap, the support including a mounting lip for resisting sliding of the support off of the cap, the mounting lip extending inwardly toward the cap and being configured to be at least partially positioned in the annular groove of the cap;

wherein the mounting lip is annular in shape and substantially continuous about the cap to engage the annular groove in the cap;

wherein the cap includes an upper stop lip and a lower annular lip each extending outwardly from the outer surface of the cap to form the annular groove therebetween.

2. The assembly of claim 1 wherein the support is removably mounted on the cap.

3. The assembly of claim 1 wherein the cap has an upper end opposite of the lower end, the upper end being closed.

4. The assembly of claim 1 wherein the mounting lip at least partially rests on the annular lip when the support is mounted on the cap.

5. The assembly of claim 1 wherein the cap comprises:

a receiver portion for receiving the upper portion of the flagpole, the receiver portion defining the cavity of the cap; and a stop portion located at the upper end of the cap, the stop portion closing an upper end of the cavity of the cap.

6. The assembly of claim 5 wherein a diameter of the annular groove is less than a diameter of an outer surface of a perimeter wall of the receiver portion.

7. The assembly of claim 5 wherein an outer diameter of the annular lip is greater than a diameter of an outer surface of a perimeter wall of the receiver portion.

8. The assembly of claim 5 wherein a diameter of an outer perimeter of the stop portion is greater than a diameter of an outer surface of a perimeter wall of the receiver portion.

9. The assembly of claim 1 wherein the support comprises:

a sleeve portion removably mounted on the cap; and an ear portion extending outwardly from the sleeve portion.

10. The assembly of claim 9 wherein the sleeve portion includes a peripheral wall, the peripheral wall defining an interior for receiving the cap.

11. The assembly of claim 10 wherein the peripheral wall has an inner surface, the mounting lip extending inwardly from the inner surface of the peripheral wall.

12. The assembly of claim 10 wherein the sleeve portion includes a slit extending between the ends of the sleeve portion, the slit being formed by a gap between opposing ends of the peripheral wall on opposite sides of the slit.

13. The assembly of claim 9 wherein the sleeve portion is formed of a rigid material with a degree of flexibility to permit the ends of the sleeve portion to be spread apart from each other by the application of finger applied force, and with a degree of resiliency to cause the ends to substantially return to a configuration of the sleeve portion prior to the application of force.

14. The assembly of claim 12 wherein the ear portion includes a pair of ears, each of the ears being positioned adjacent to one of the ends of the peripheral wall of the sleeve portion.

15. The system of claim 1 wherein the upper end of the flag pole is received by the bracket assembly.

16. A flag support bracket assembly for mounting on an upper end of a flagpole, comprising:

a cap having an outer surface and an annular groove formed in the outer surface; and a support mounted on the cap, the support being rotatable with respect to the cap, the support including a mounting lip for resisting sliding of the support off of the cap, the mounting lip extending inwardly toward the cap and being configured to be at least partially positioned in the annular groove of the cap;

wherein the mounting lip is annular in shape and substantially continuous about the cap to engage the annular groove in the cap;

wherein the cap includes an upper stop lip and a lower annular lip each extending outwardly from the outer surface of the cap to form the annular groove therebetween.

17. A flag support bracket assembly for a top end of a flagpole, comprising:

a cap for mounting on the upper end of the flagpole, the cap defining a cavity extending inwardly from an opening in a lower end of the cap, the cap having an outer surface, the cap having an annular groove formed in the outer surface; and a support mounted on the cap, the support being rotatable with respect to the cap, the support including a mounting lip for resisting sliding of the support off of the cap, the mounting lip extending inwardly toward the cap and being configured to be at least partially positioned in the annular groove of the cap;

wherein the mounting lip is annular in shape and substantially continuous about the cap to engage the annular groove in the cap;

wherein the annular groove of the cap and the mounting lip of the support are configured such that the support is removed with the cap when the cap is removed from the top end of the flagpole.

* * * * *